United States Patent Office 2,936,061
Patented May 10, 1960

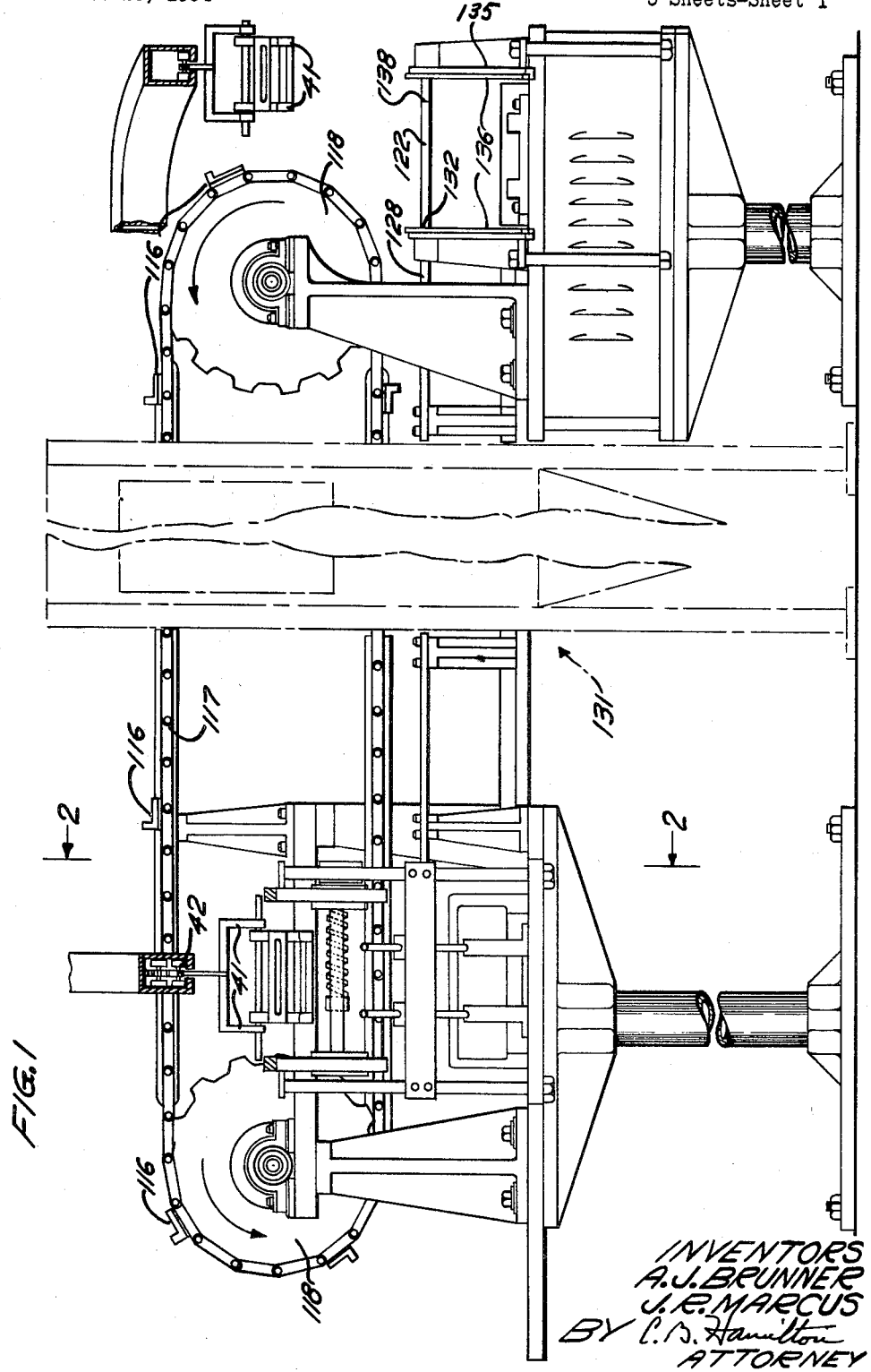

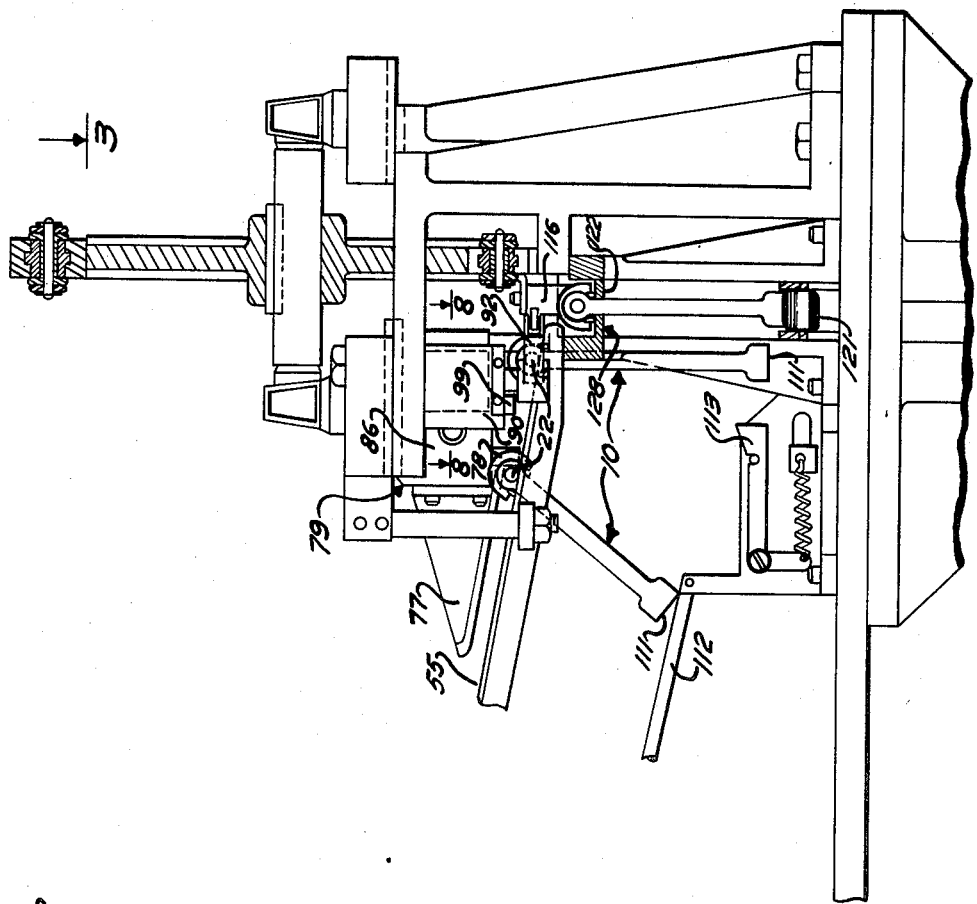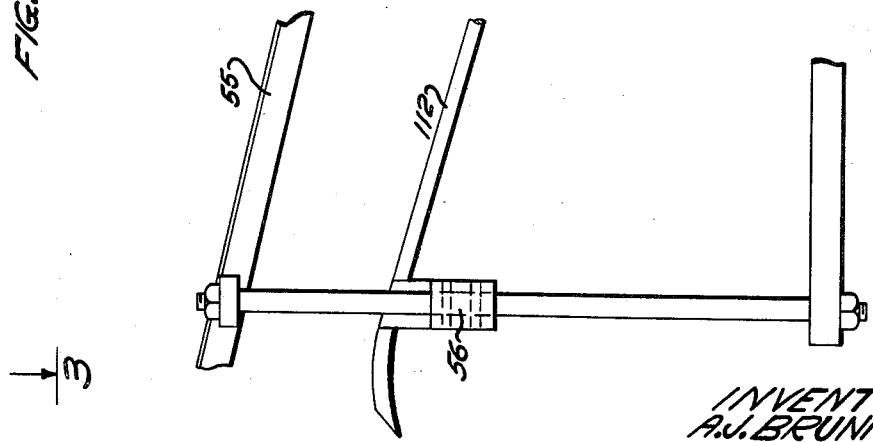

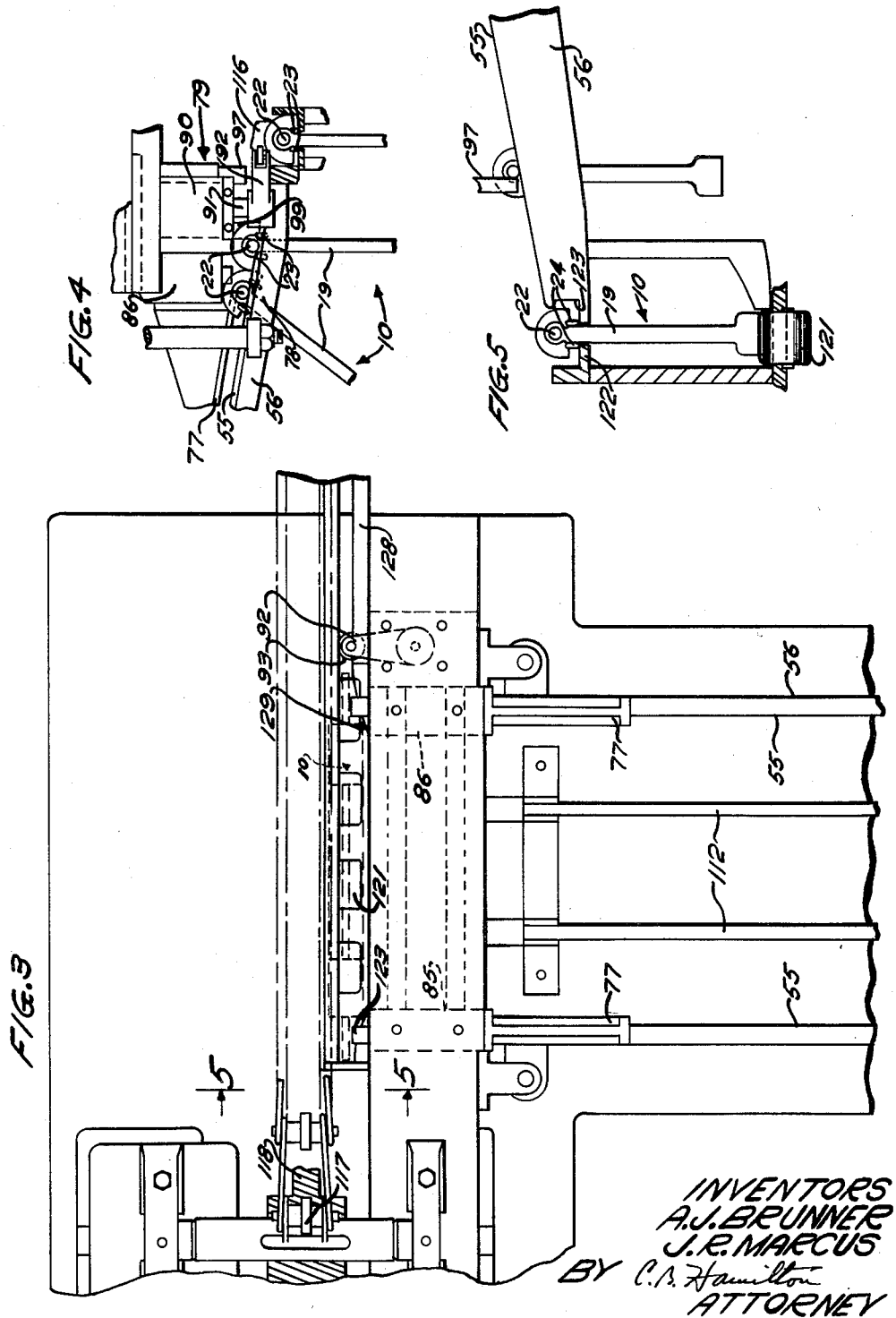

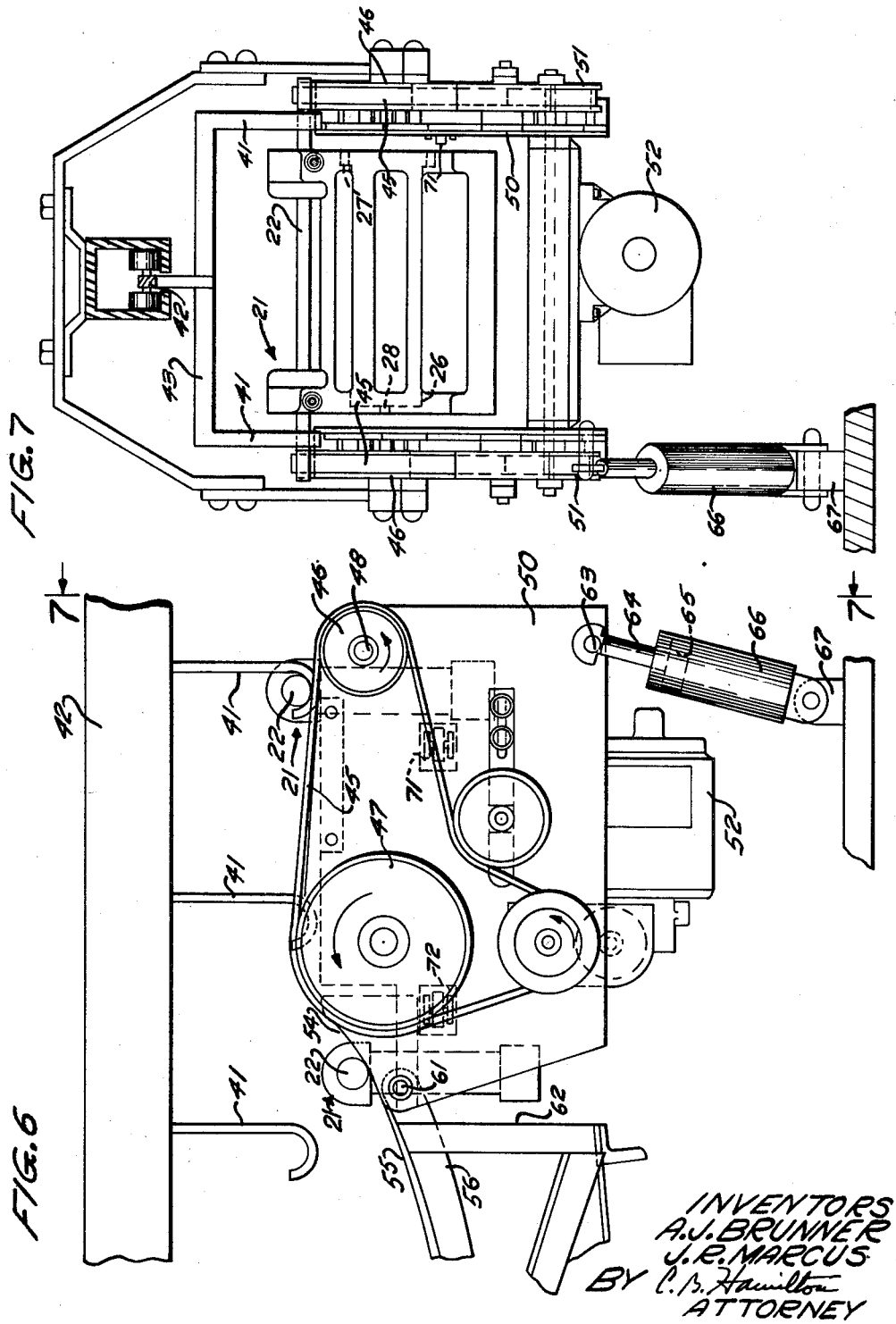

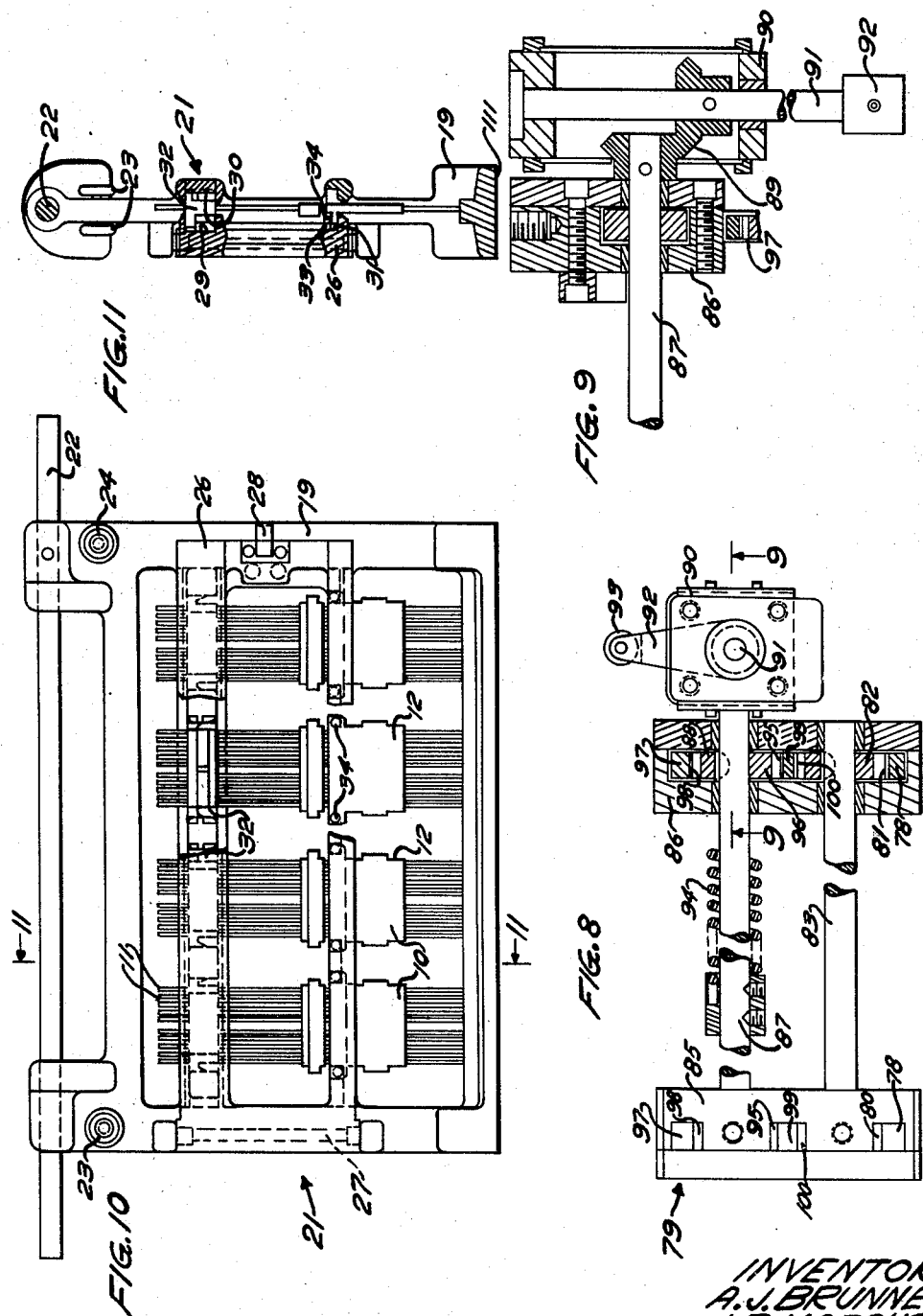

2,936,061

ARTICLE-HANDLING DEVICES

Anton J. Brunner, Congress Park, and Jerome R. Marcus, Chicago, Ill., assignors to Western Electric Company, Incorporated, New York, N.Y., a corporation of New York Application November 26, 1954, Serial No. 471,201

12 Claims. (Cl. 198—177)

This invention relates to article-handling devices, and more particularly to apparatus for conveying racks of wire spring relay combs through a grit blasting machine.

An object of the invention is to provide new and improved apparatus for carrying racks of articles.

Another object of the invention is to provide apparatus for automatically carrying racks of articles to and through a grit blasting machine.

Another object of the invention is to provide apparatus for transferring racks of articles from hook conveyors to belt conveyors and from belt conveyors to slides.

Another object of the invention is to provide a new and improved apparatus for feeding racks seriatim from slides to a trackway.

An article-handling device illustrating certain features of the invention may include a hook conveyor for carrying an article-holding fixture along a predetermined path and belt conveyor intersecting the path for lifting the fixture from the hook conveyor.

An apparatus illustrating the invention more in detail may include a plurality of racks for holding and masking portions of wire spring relay combs and a grit blaster for blasting flash from the wire spring relay combs. A pair of rails are provided along which rollers on the racks rest to transport the racks through the grit blaster and an inclined ramp having an indexing or escape mechanism at the lower end thereof which is provided for supplying the racks one at a time to the guide rail. A hook conveyor for supporting the racks is moved toward the ramp at a predetermined rate of speed and a pair of belt conveyors are provided for lifting the racks forward more rapidly than the hook conveyors and lowering the racks onto the ramp.

A complete understanding of the invention may be obtained from the following detailed description of a device forming a specific embodiment thereof, when read in conjunction with the appended drawings, in which Fig. 1 is a fragmentary elevation of a portion of a device forming a specific embodiment of the invention;

Fig. 2 is a fragmentary vertical section taken along line 2—2 of Fig. 1;

Fig. 3 is a fragmentary top plan view taken along line 3—3 of Fig. 2;

Fig. 4 is a fragmentary vertical section similar to Fig. 2;

Fig. 5 is a vertical section taken along line 5—5 in Fig. 3;

Fig. 6 is an enlarged fragmentary vertical section;

Fig. 7 is a vertical section taken along line 7—7 of Fig. 6;

Fig. 8 is a horizontal section taken along line 8—8 of Fig. 2;

Fig. 9 is an enlarged vertical section of a portion of the device shown in Fig. 8;

Fig. 10 is an enlarged elevation of a portion of the apparatus shown in Fig. 1, and Fig. 11 is a vertical view section taken along line 11—11 of Fig. 10.

Referring now in detail to the drawings, there is shown therein a machine for grit blasting wire spring relay combs 10 (Fig. 10) to remove flash from wires 11 of the combs adjacent to plastic blocks 12 molded around the wires. The combs are placed on carrying fixtures or racks 21, each of which is provided with a carrying rod 22 fastened rigidly to the top of a frame 19, and pairs of rollers 23 and 24 are mounted on the frame below the rods 22. The combs 10 are clamped on the frame by an apertured door 26 mounted pivotally on a spring-mounted pin 27 and latched in position by a latch 28. The door 26 is provided with a groove 29 and the frame 19 with a groove 30 for receiving and masking a molded bar 32 of the comb 10 to protect the bar 32 during blasting. The door 26 also is provided with a groove 33 for masking dowel pins 34 secured to the block 12. When the door is not secured by the latch 28, the pin 27 urges it to an open position slightly greater than 90° from its closed position.

After the combs 10 are racked on the racks 21, the racks are hung on pairs of hooks 41 (Figs. 6 and 7) fixed to T-shaped supports 43 carried by a conveyor 42, which carries the racks by the rods 22 at a fixed level as they approach a pair of belts 45 and carries them onto the belts 45. The upper portions of the belts 45 are driven in the same general direction as the hooks 41 but at a substantially higher rate of speed than that of the hooks 41. The belts 45 course on pairs of idler pulleys 46 and 47 mounted on shafts 48 and 49, respectively, supported by a channel-like frame 50, and are driven by drive pulleys 51 driven by an electric motor 52 also supported by the frame 50. The belts 45 bracket the hooks 41 and engage the end portions of the rods 22 and lift the rods 22 out of the hooks 41 and move them in advance of the hooks to a pair of chute rail segments 54 fixed to the frame 50 leading to rails 55 of a chute 56 down which the rods 22 slide.

The frame 50 is supported pivotally by fixed pins 61 supported by a supporting structure 62 of the chute 56. The frame 50 also is supported pivotally by a pin 63 secured to a piston rod 64 of a piston 65 mounted in a double-acting cylinder 66 mounted pivotally by a fixed bracket 67. If one of the racks 21 approaching the belts 45 is empty, its door 26 is left open and extends to the right of the frame 19 slightly so that it actuates a limit switch 71 so positioned that it is actuated only when an open door 26 is moved therepast. Actuation of the limit switch actuates a valve (not shown) to supply air under pressure to the upper end of the cylinder and exhaust the lower end of the cylinder. The piston 65 then is moved downwardly to swing the frame 50 in a clockwise direction, as viewed in Fig. 6, to lower the upper portions of the belts 45 below the hooks 41 so that the empty rack is left on the hooks. Then, as the empty rack clears the lefthand ends of the belts 45, the open door actuates a limit switch 72 to reverse the valve to return the frame 50 to its operative or rack-removing position. Thus, only filled racks are transferred from the hooks 41 to the chute 56.

As the racks 21 travel down the chute 56 they pass under upper guides 77 and come to escapement bars 78 of an escapement 79 (Figs. 2 and 8), drivable through racks 80 and 81 and pinions 82 fixed to a shaft 83. The shaft 83 is mounted rotatably in fixed supports 85 and 86, which also support rotatably a shaft 87 having pinions 88 keyed thereto. The shaft 87 is connected through a gearing 89 (Fig. 9) in a fixed housing 90 to a shaft 91 having a lever 92 keyed thereto and supporting a roller 93 at its free end. The lever 92 normally is biased to the position thereof shown in Fig. 8 by a torsion spring 94 secured at its ends to the shaft 87 and to the support 86. However, when the lever 92 is swung in a clockwise direction, as viewed in Fig. 8, the shaft 87 turns pinions 96 keyed thereto in a direction lifting stop bars 97 having rack portions 98 relative to the supports 85 and 86 and the chute 56. The pinions 96 also engage racks 95 of stop bars 99 to move the bars 99 downwardly into the path of the racks 21 on the chute 56, and racks 100 on the bars 99 turn the pinions 82 to raise the stop bars 78 out of the paths of the rods 22 of the racks 21 on the chute 56 to let one of the racks 21 slide past the stop bars 78 to the stop bars 99. As the rack 21 slides past the bars 78, a shoe 111 thereof clears rack-dragging or tilting rods 112 of the chute 56 and the rack 21 swings to a vertical position, brushing past spring-pressed swing damping levers 113 as the rack 21 so swings. This rack 21 then hangs vertically.

The lever 92 is swung against the action of the spring 94 as described above by a cam lug 116 carried by a grit blasting conveyor chain 117 (Fig. 1) coursing on sprockets 118 moved past the lever 92 as the lug 116 removes from the end of the chute 56 the rack 21 previously released by the bars 97 when they were lifted by the preceding lug 116. When the lug 116 clears the lever 92, the spring 94 returns the lever 92 and the bars 78, 97 and 99 to their former positions in which the bars 78 and 97 stop movement of the racks 21 down the chute 56, and the bars 99 are retracted to release the rack 21 held thereby, which slides on down to the bars 97. The motion of the bars 78 and 97 relative to the bars 99 is such that the bars 78 and 97 are in rack-blocking positions before the bars 99 are withdrawn from rack-blocking positions.

As each rack 21 is released by the bars 97, it slides down the chute 56 and drops off the end thereof onto supporting rollers 121 and onto a guide rail 122 over which the rollers 23 and 24 project. An end 123 of the guide rail 55 prevents the rack 21 from bouncing back to the right, as viewed in Fig. 5. Then, as the next lug 116 comes along to the chute 56, the lug engages the rod 22 of the rack 10 just released by the bars 97 and pushes the rack edgewise along the guide rails 122 and 128 (Figs. 2 and 3), the guide rail 128 having a camming portion 129 which centers the rack 21 between the guide rails 122 and 128 as the rack 121 is moved edgewise therebetween.

The lugs 116 push the racks 21 edgewise along the guide rails 122 and 128 through a grit blaster 131 (Fig. 1) of a well known type, in which grit is blown against the portions of the wires 11 adjacent to the molded blocks 12 and 32 (Fig. 10) to clean flash formed in molding the blocks from the wires. The door 26 and the body 19 of the rack 21 mask the blocks 12 and 32 from the grit while the flash is removed from the portions of the wires adjacent thereto. The racks 21 travel to the right, as viewed in Fig. 1, emerge from the grit blaster 131 and arrive at an opening 132 in the rail 128 and tilt off the rail 122 onto a discharge chute 135 having inclined rails 136 along which the rods 22 slide, camming means 138 being provided to tilt the racks 21.

The above-described apparatus serves to convey the racks 21 from molding presses or the like, transfer the racks to the chute 56, feed the racks 21 seriatim to the guide rails 122 and 128, advance the rack through the grit blaster to remove the flash, and discharge the racks to the chute 135 all automatically. The racks 21 may be removed manually from the chute 135, unloaded and replaced on the hooks 41, which convey the empty racks to loading stations.

Certain features of the escapement 79, damping levers 113 and associated elements are disclosed and claimed in copending application Serial No. 471,232, filed November 26, 1954, by F. M. Baluck, A. J. Brunner and H. F. Runge for "Conveyors."

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An article-handling device, which comprises an article-holding fixture having pins projecting from the sides thereof, rollers mounted on said fixture, a conveyor having a pair of hooks for receiving the pins to carry the fixture along a predetermined path, a belt conveyor intersecting said path for lifting the fixture from the first-mentioned conveyor, a guide rail, and means for transferring said fixtures from said belt conveyor to place the rollers on said guide rail.

2. An article-handling device, which comprises a flat article-clamping rack having a pair of pins projecting from the edges thereof and rollers mounted on the faces thereof, a pair of hooks for engaging the pins and carrying the rack face-wise along a predetermined path, a pair of guide rails bracketing a portion of the path and engageable by the rollers for supporting the racks, and means positioned along said path for transferring the rack from the hooks to the guide rails.

3. An article-handling device, which comprises a flat article-clamping rack having a pair of pins projecting from the edges thereof and rollers mounted on the faces thereof, a pair of hooks for engaging the pins and carrying the rack face-wise along a predetermined path, a pair of guide rails extending from said path and engageable by the rollers for supporting the racks, and means including a pair of belts offset laterally and coursing from below the hooks to to above the hooks and then from above the hooks to below the hooks for transferring the rack from the hooks to the rails.

4. An article-handling device, which comprises a conveyor movable in one direction along a predetermined path, a pair of hooks supported by the conveyor at the same point along the conveyor in positions spaced from one another and facing in said direction, an article-carrying fixture having pins projecting from opposite sides thereof for engagement by the hooks and projecting beyond the hooks, whereby the fixture is carried by the hooks, rollers rotatably mounted on the other two sides of the fixture, a pair of endless belts, means for coursing the belts in paths bracketing the paths of the hooks and in which the belts rise from below the hooks to above the hooks and engage the pins to lift the pins out of the hooks and then dip below the hooks, means for moving the conveyor at one rate of speed, means for advancing the belts at a greater rate of speed, whereby the fixture is lifted from the hooks, is moved ahead of the hooks and then is lowered beneath the hooks, guide rails spaced apart and positioned transversely of the direction of movement of the belts, one of said rails having an opening therein to permit passage therethrough of a fixture and means for transferring a fixture from the belt conveyor through said opening to position the rollers on the guide rails.

5. An article-handling device, which comprises a conveyor movable in one direction along a predetermined path, a pair of hooks supported by the conveyor at the same point along the conveyor in positions spaced laterally from one another and facing in said direction, an article-carrying fixture having pins projecting from opposite sides thereof for engagement by the hooks, whereby the fixture is carried by the conveyor, rollers mounted on the other sides of the fixture, a pair of endless conveyor elements, means for mounting the conveyor elements for movement in said direction along paths offset laterally from the paths of the hooks in which the conveyor elements rise from below the hooks to above the hooks and engage he pins to lift the pins out of the hooks and then dip below the hooks, means for moving the conveyor at one rate of speed, means for advancing the conveyor elements at a greater rate of speed, a second conveying means positioned transversely of the first conveyor, and means for transferring each fixture from the conveyor element to said second conveying means to position the rollers on said second conveying means.

6. An article-handling device, which comprises an article-carrying rack of a predetermined width, a pair of supporting pins projecting a predetermined distance from opposed edges of the rack for supporting the rack, a pair of inclined guide rails spaced apart a distance slightly greater than the width of the rack down which the pins may slide, a chain conveyor travelling toward the rails at a level above the rails, a pair of hooks for engaging the pins and carried by the conveyor in forwardly facing positions above the guide rails and spaced apart such a distance that the hooks are in the same vertical planes as the guide rails as the hooks approach the guide rails, a pair of endless belts, means for advancing the belts, movable means supporting the belts for movement along paths bracketing the hooks in which the upper portions extend proceeding from points away from the guide rails to the guide rails gradually upwardly from below the hooks to above the hooks and then from above the hooks to below the hooks, and means responsive to empty racks for lowering the supporting means away from the hooks.

7. An article-handling device, which comprises an inclined pair of guide rails, a rack having a body portion and also provided with a pair of pins extending from the ends of the body portion and designed to engage the guide rails and rollers extending transversely of the pins on both sides of the rack, a third guide rail positioned at the lower ends of and extending angularly from said pair of guide rails for engaging the rollers on one side of the rack as the rack slides off the first-mentioned guide rails, means for pushing the rack along the third guide rail, and a fourth guide rail extending from one of the said pair of guide rails and parallel to the third guide rail for supporting the rollers on the other side of the rack.

8. An article-handling device, which comprises an inclined pair of guide rails, a rack having a flat body portion and also being provided with a pair of pins extending from opposite edges of the body portion and designed to engage the guide rails and rollers projecting transversely of the pins from opposite faces of the body portions, a third guide rail positioned transversely of said pair of guide rails at the lower ends of said pair of guide rails for supporting the rollers on one side of the rack as the rack slides off the pair of guide rails, means for pushing the rack edgewise along the third guide rail, a fourth guide rail extending from one of the said pair of guide rails parallel to the third guide rail for supporting the rollers on the other side of the rack, and means for guiding the rack along the third rail to the fourth rail.

9. An article-handling device, which comprises an inclined pair of guide rails, a plurality of racks each having a body portion and also provided with a pair of pins designed to engage the guide rails and rollers extending transversely of the pins, escapement means at the lower ends of the rails for permitting the rack to drop off the rails, guide means positioned at the lower ends of said pair of guide rails and extending angularly with respect thereto for engaging the rollers on one side of the rack as the rack is permitted to slide off the guide rails, and means for pushing the rack along said guide means and actuating the escapement means.

10. An article-handling device, which comprises a plurality of racks each having pins projecting from the ends thereof, elements extending from the other sides of each rack, a pair of inclined guide rails down which the pins may slide, escapement means for permitting one of the racks to slide off the lower ends of the guide rails for each actuation of the escapement means, a guide extending transversely of the guide rails from the lower ends thereof, for engaging said elements to support the racks thereon and pusher means for pushing each rack edgewise along the guide and actuating the escapement means as the rack being pushed clears the guide rails.

11. In an article transfer apparatus, a first conveyor, said first conveyor having a plurality of supports secured thereto and projecting downwardly therefrom, article carriers removably positioned on said supports, selectively positionable means on said article carriers, a second conveyor, said second conveyor comprises a pair of endless belts and normally intersecting the path of movement of the article carriers positioned on said supports of said first conveyor for moving said article carriers therefrom, a movable mounting for said second conveyor, and switch means actuated by said selectively positionable means for moving the mounting to move the second conveyor from the path of the article carriers.

12. In an article transfer apparatus, an article carrier having an element selectively positionable in two positions, a first conveyor, support means secured to said first conveyor and projecting downwardly therefrom for transferring said article carrier along a predetermined path, a second conveyor normally intersecting the predetermined path for removing the carrier from said support means, a movable mounting for said second conveyor, a first switch means responsive to said element on said carrier in a first position for actuating said mounting to move said second conveyor downwardly from intersection with said path of the first conveyor, and a second switch means responsive to said element in said first position for again rendering said mounting effective to restore said second conveyor to the initial position.

References Cited in the file of this patent

UNITED STATES PATENTS

| | | |
|---|---|---|
| 465,018 | Foote | Dec. 15, 1891 |
| 801,523 | Hinchman et al. | Oct. 10, 1905 |
| 1,085,125 | Hoagland | Jan. 27, 1914 |
| 1,512,186 | Amory | Oct. 21, 1924 |
| 1,512,250 | Taisey | Oct. 21, 1924 |
| 1,923,663 | Coda | Aug. 22, 1933 |
| 1,992,686 | Anderson | Feb. 26, 1935 |
| 2,679,810 | Schutt | June 1, 1954 |